United States Patent [19]

Kaptanis

[11] 4,066,279

[45] Jan. 3, 1978

[54] PNEUMATIC SPRING OF ADJUSTABLE LENGTH

[75] Inventor: Panoyotis Kaptanis, Neuwied, Germany

[73] Assignee: Stabilus GmbH, Koblenz, Germany

[21] Appl. No.: 669,640

[22] Filed: Mar. 23, 1976

[30] Foreign Application Priority Data

Mar. 26, 1975 Germany .................. 2513302

[51] Int. Cl.² ............................................. F16F 5/00
[52] U.S. Cl. ................................. 280/711; 267/65 R
[58] Field of Search ................... 267/120, 65 R, 65 D; 188/284, 196 P; 280/711

[56] References Cited

U.S. PATENT DOCUMENTS

| 1,446,793 | 2/1963 | Gruss | 267/65 R |
| 3,917,245 | 11/1975 | Fengler | 267/120 |

Primary Examiner—Philip Goodman
Attorney, Agent, or Firm—Hans Berman

[57] ABSTRACT

The piston rod of a pneumatic spring is expelled from the cylinder by compressed fluid in the cylinder until a normally open channel connecting two compartments of the cylinder cavity on opposite axial sides of the piston is blocked by cooperating valve elements on the cylinder and on the piston assembly.

10 Claims, 3 Drawing Figures

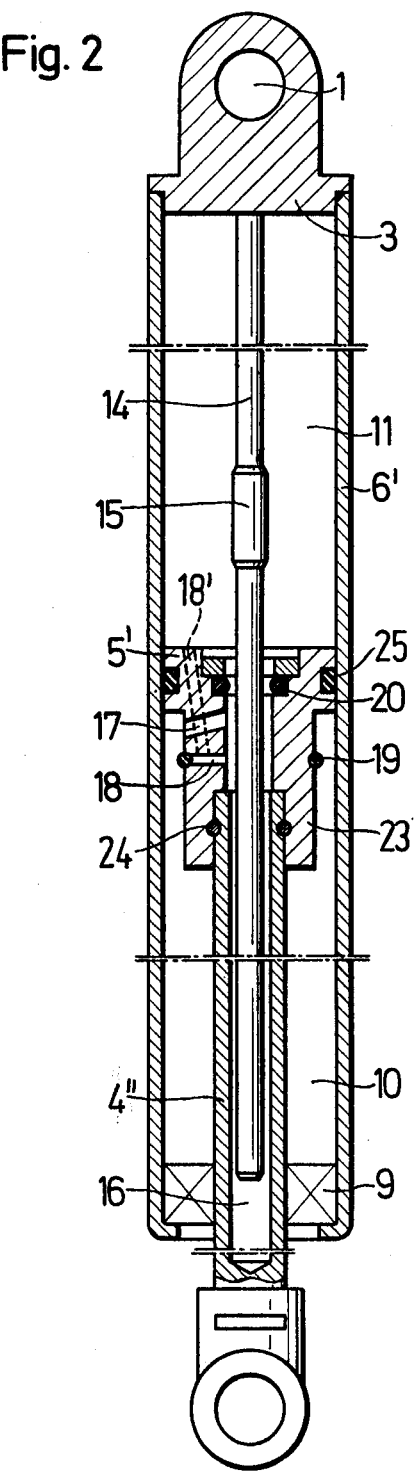
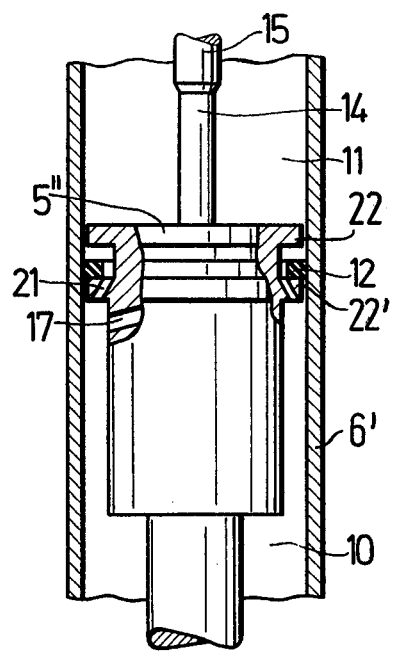

PNEUMATIC SPRING OF ADJUSTABLE LENGTH

This invention relates to a pneumatic spring of adjustable length having a piston assembly whose piston portion divides the cavity of a cylinder into two compartments and a piston rod portion extending from the piston portion axially outward of the cavity, while a valve may be opened and closed to control flow of compressed fluid between the compartments, whereby a length change of the spring may be permitted or blocked.

It is known at least partly to balance the weight of a trunk lid or of the hood in an automotive vehicle mounted for pivoting movement about a horizontal axis by means of pneumatic springs which replace the helical compression springs earlier employed for the same purpose. It would be advantageous to employ balancing springs whose action on the trunk lid or hood could be stopped in several angular positions of the lid or hood corresponding to respective overall lengths of the pneumatic springs. The known, valved, pneumatic springs, however, are not well suited for this application since they require volve actuating elements accessible for manual operation, and it would be difficult on an automotive vehicle to provide suitable access. Moreover, the known valved springs are more costly than would be justifiable in the afore-described automotive application.

It is a primary object of this invention to provide a pneumatic spring of the valved type whose expansion stops automatically at a pre-set length and may be resumed by the action of an operator not relying on access to a specific valve control element.

Another object is the provision of such a spring which is low in cost, composed of relatively few and rugged parts, and therefore reliable in its operation over an extended period of time.

With these and other objects in view, as will presently become apparent, the invention provides a pneumatic spring whose cylinder bounds a sealed cavity. Its piston assembly includes a piston portion movable in the cylinder cavity between two axially terminal positions and separating two compartments of the cavity, and an elongated piston rod portion having one axially terminal part fastened to the piston portion and another terminal part outside the cylinder cavity. The piston rod portion movably passes through the cylinder. A body of fluid is confined in the cylinder cavity under a pressure higher than atmospheric pressure and permanently biases the piston rod portion outward of the cavity. A channel connects the compartments for flow of fluid therebetween and may be closed and opened by cooperating valve elements on the cylinder and on the piston assembly. In response to movement of the piston portion into a position spacedly intermediate its terminal positions, the valve elements close the channel and thereby seal the compartments from each other. In respone to movement of the piston portion from the intermediate position toward either terminal position, the valve elements open the channel.

Other features, additional objects, and many of the attendant advantages of this invention will readily be appreciated as the same becomes better understood by reference to the following detailed description of preferred embodiments when considered in connection with the appended drawing in which:

FIG. 2 illustrates another pneumatic spring of the invention in a view corresponding to that of FIG. 1, but in a different operating condition; and FIG. 3 is a fragmentary view of a modification of the spring of FIG. 2.

Figure 1:
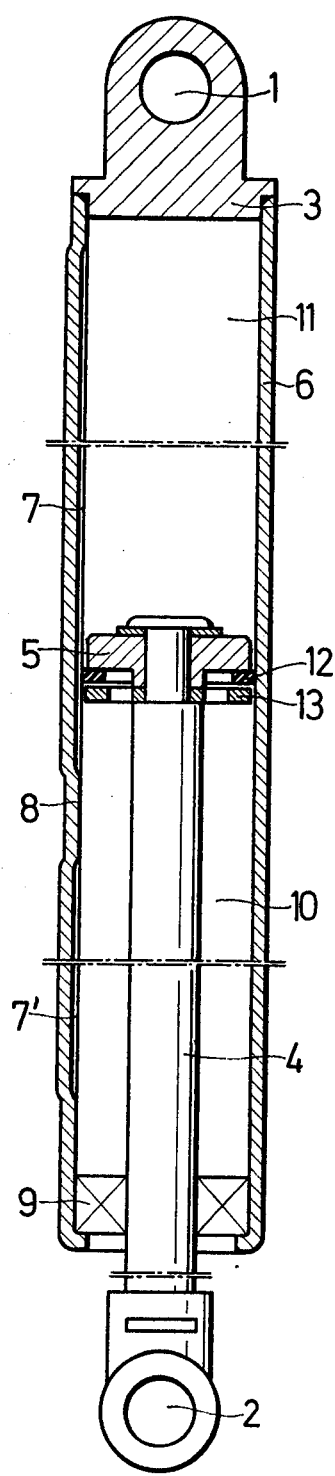
FIG. 1 shows a pneumatic spring of the invention in axial section.

Referring now to the drawing in detail, and initially to FIG. 1, there is shown a pneumatic spring of conventional external appearance and equipped with mounting eyes 1, 2 which may be attached to the body and the trunk lid or motor hood of an automotive vehicle respectively. The eye 1 is fixedly fastened to an imperforate end wall 3 of a cylinder 6. A piston rod 4 axially projecting from the other, annular end wall 9 of the cylinder carries the eye 2. The end wall 9 includes a packing, conventional and not shown in detail, which permits axial movement of the piston rod 4 into and out of the cavity in the cylinder 6 without permitting escape of the compressed air or nitrogen which fills all available space in the cavity.

The piston rod 4 constitutes a portion of a piston assembly whose piston portion 5 is attached to the inner axial end of the piston rod 4. The piston 5 is axially guided in the cylinder 6 with some clearance and axially separates two compartments 10, 11 of the cylinder cavity. Radial engagement with the inner, axial wall of the cylinder 6 is maintained at all times by a piston ring 12 spacedly enveloping the piston rod 4 and confined for limited axial movement between an annular, radial face of the piston 5 and a retaining ring 13 fixedly mounted on the piston rod 4 by means of an integral spider.

The inner wall of the cylinder 6 is formed with two sets of axially elongated grooves 7, 7', only one groove of each set being shown in order not to crowd the drawing. The grooves 7, 7' are formed by displacing portions of the cylinder wall radially outward so that a rib in the outer cylinder wall corresponds to each groove 7, 7'. The two sets of grooves are separated by a cylindrical wall portion 8 whose diameter is essentially equal to the outer diameter of the piston ring 12.

When the pneumatic spring shown in FIG. 1 is installed in an automotive vehicle between a hood or lid and the vehicle body, and the hood or lid is locked in the closed position, the length of the spring, as measured between the eyes 1, 2, is at its minimum, and the piston 5 is in its axially terminal position near the imperforate end wall 3. The two compartments 10, 11 communicate through the groove or grooves 7. The fluid pressure in the cylinder cavity biases the piston rod 4 outward of the cavity.

When the hood or lid is unlocked, the spring expands and the piston 5 moves toward the annular end wall 9. Frictional engagement with the inner cylinder wall holds the piston ring 12 in the illustrated position of abutting engagement with a radial piston face, whereby gas can flow from the shrinking compartment 10 into the expanding compartment 11 through the groove or grooves 7 only. Communication between the compartments is interrupted when the piston ring 12 is axially coextensive with the smoothly cylindrical cylinder wall portion 8.

It may be convenient to locate the wall portion 8 in such a manner that a partly opened hood held in its angular position by the spring gives access to a dip stick on the crankcase and to inspection plugs on the battery without permitting rain to fall into the motor compartment. A trunk lid may be similarly secured in a partly open position to permit a long load, such as a pair of skis, to project rearwardly from the trunk.

If it is desired fully to open the hood or lid, the operator may lift the hood or lid manually against the weak restraint of the gas in the cylinder until the piston ring 12 clears the wall portion 8 and approaches the end wall 9, thereby permitting the gas again to flow from the compartment 10 into the compartment 11 and to further expel the piston rod 4 until the piston 5 reaches its terminal position near the end wall 9.

When the hood or lid is to be closed, manual force is applied to the hood or lid to drive the piston rod 4 inward of the cylinder 6. Because of its frictional engagement with the inner cylinder wall, the piston ring 12 lags behind the piston 5 and moves into abutting engagement with the retaining ring 13. An additional flow path between the compartments 10, 11 becomes available through the openings between the spider arms of the ring 13, the central aperture of the piston ring 12, and the approximately annular clearance gap between the piston 5 and the inner wall of the cylinder 8. This additional flow path remains unobstructed during the closing movement of the hood or lid even while the piston ring 12 moves over the cylindrical, intermediate wall portion 8 of the cylinder 6.

The pneumatic spring shown in FIG. 2 differs in external appearance from that described with reference to FIG. 1 by the absence of the axial ribs corresponding to the grooves 7, 7'. The wall of the cylinder 6' is smoothly cylindrical between the end walls 3, 9. A slim plunger 14 is coaxially attached to the end wall 3 and extends into a central axial bore 16 of the piston assembly approximately to the end wall 9. The plunger 14 is a cylindrical rod of uniform cross section over its entire length except for a radially enlarged cylindrical portion 15 which, in the condition of the spring illustrated in FIG. 2, is entirely located in the compartment 11.

The piston assembly includes a tubular piston rod 4" and a tubular piston 5', respective portions of the bore 16 in the piston and piston rod being axially aligned. The piston 5' is provided with a sealing ring 25 which engages the inner wall of the cylinder 6' in all positions of the piston assembly and prevents fluid flow between the compartments 10, 11 along the cylinder wall.

A reduced axial stem portion 23 of the piston 5' is fixedly fastened to the piston rod 4' by a wire ring 24. A radial duct 17 in the stem portion 23 is permanently open to the compartment 10 and to the axial bore 16. A resilient O-ring 20 inserted in the piston 5' as a valve seat restricts the cross section of the bore 16 between the orifice of the duct 17 and the end of the bore 16 open toward the compartment 11 to sligthly less than the cross section of the enlarged plunger portion 15 when the O-ring 20 is in the relaxed condition.

Another radial duct 18 in the stem portion 23 has a permanently open orifice in the bore 16 closely adjacent the orifice of the duct 17. Its outer orifice toward the compartment 10 is sealed in the illustrated condition of the spring by a resilient ring 19. A branch duct 18' extends axially from the duct 18 to an orifice in the piston 5' permanently open to the compartment 11.

As illustrated, the piston 5' is in its axially terminal position near the end wall 9 when the associated, non-illustrated trunk lid or motor hood is in its fully opened position determined by elements of the vehicle, not shown. When the hood or lid is closed manually, the piston rod 4" is pushed inward of the cylinder 6', and fluid flows from the shrinking compartment 11 into the expanding compartment 10 through the bore 16 and the duct 17 until the enlarged plunger portion 15 is sealingly received in the compressed O-ring 20. The pressure differential between the compartments 10, 11 caused by continued, manual, closing movement of the hood or lid causes the ring 19 to expand, whereby fluid flow from the compartment 11 to the compartment 10 can continue through the ducts 18, 18' until the plunger portion 15 clears the O-ring 20 and fluid flow through the duct 17 is resumed while the piston 5' approaches its terminal position near the end wall 3, and the hood or lid is engaged by a latch on the vehicle body.

Upon unlatching, the hood or lid opens automatically to an intermediate position defined by engagement of the enlarged plunger portion 15 with the O-ring 20, whereupon further opening movement is initiated by manually raising the hood or lid until the enlarged plunger portion 15 moves into the orifice of the bore 16 toward the compartment 11.

It is a common feature of the two afore-described embodiments of the invention that they are equipped with a main valve which responds to movement of the piston assembly to a position spacedly intermediate the two axially terminal positions for closing a flow channel between the compartments 10, 11, thereby blocking the associated hood or lid in an intermediate angular position. In the device of FIG. 1, the cooperating valve elements are the inner wall portion 8 of the cylinder 6 and the piston ring 12 on the piston assembly. In the device of FIG. 2, the enlarged plunger portion 15, fixedly mounted on the cylinder 6', similarly cooperates with the O-ring 20 on the piston 5'. Both valves open a flow channel between the cylinder compartments when the respective pistons move from the intermediate position toward either axially terminal positions. During the movement of the piston assembly inward of the cylinder, the main valve is by-passed by a check valve arrangement which has the piston ring 12 in FIG. 1 in common with the main valve. In the spring of FIG. 2, the main element of the check valve is the ring 19.

The main valve shown in FIG. 2 may be combined with a check valve of the type shown in FIG. 1 as is illustrated in FIG. 3, and one skilled in the art will readily combine the check valve arrangement of FIG. 2 with the main valve shown in FIG. 1. In this non-illustrated variation of the invention, the gap between the retaining ring 13 and the piston 5 will be reduced to hold the piston ring 12 in axial abutting engagement with the piston 5 at all times, and the piston rod 4 will be formed with a duct having orifices in the compartments 10, 11, the orifice in the compartment 10 being sealed by a resilient ring as is shown in FIG. 2.

In the variation of the spring of FIG. 2 illustrated in FIG. 3, the piston 5" differs from the piston 5' by the absence of the sealing ring 25 and of the by-pass ducts 18, 18'. The piston 5" is equipped with two radial flanges 22, 22' whose diameters are slightly smaller than the inner diameter of the cylinder 6', and whose axial spacing is sufficient to permit limited axial movement of a piston ring 12 which sealingly engages the cylinder wall. A bore 21 in the flange 22' permanently connects the central opening in the piston ring 12 with the compartment 10. During movement of the piston assembly inward of the cylinder 6', the piston ring 12 lags behind the piston 5" because of frictional engagement with the cylinder 6', and a by-pass is provided around the closed valve constituted by the enlarged plunger portion 15 and the O-ring 20, not specifically shown in FIG. 3.

As is well known, the cylinder cavities of pneumatic springs may be filled partly by a liquid which may or may not be separated from the compressed gas by a floating partition, and the elastic characteristics of the spring and its damping properties are modified by the ratio of liquid and gas in the cavity in a manner known in itself and not relevant to the basic aspects of this invention. A fluid other than a gas may thus occupy portions of the cylinders 5, 5', 5", and be exposed to the pressure of the simultaneously present gas.

The pneumatic springs of the invention have been described in connection with automotive applications. Other applications will readily suggest themselves to those skilled in the art. More than one blocking or intermediate position of the piston assembly may be provided in an obvious manner if so desired.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A pneumatic spring comprising:
  a. a cylinder having an axis and bounding a sealed cavity therein;
  b. a piston assembly including
    1. a piston portion movable in said cavity between two axially terminal positions and separating two compartments of said cavity, and
    2. an axially elongated piston rod portion having one axially terminal part fastened to said piston portion in said cavity and another axially terminal part outside said cavity, said piston rod portion movably passing through said cylinder;
  c. a body of fluid in said cavity under a pressure higher than atmospheric pressure and permanently biasing said piston rod portion outward of said cavity;
  d. conduit means bounding a channel connecting said compartments for flow of said fluid between said compartments; and
  e. cooperating valve means on said cylinder and on said piston assembly responsive to movement of said piston portion into a position spacedly intermediate said terminal positions for closing said channel and for thereby sealing said compartments from each other, and responsive to movement of said piston portion from said intermediate position toward either terminal position thereof for opening said channel.

2. A spring as set forth in claim 1, wherein said cylinder has an inner face bounding said cavity and formed with an axially elongated groove therein, said face constituting a portion of said conduit means, and said groove constituting a portion of said channel.

3. A spring as set forth in claim 2, wherein said face has a face portion axially offset from said groove, and said piston assembly has an annular face extending about said axis and shaped for sealing engagement with said face portion in said intermediate position of said piston portion, said face portion and said annular face constituting said valve means.

4. A spring as set forth in claim 1, wherein said piston assembly is formed with an axial passage constituting a portion of said channel, and said valve means include a rod member axially fastened to said cylinder and partly received in said passage and a valve seat member mounted on said piston assembly in said passage, an axial portion of said rod member being enlarged for sealing engagement with said valve seat member in said intermediate position of said piston portion.

5. A spring as set forth in claim 1, further comprising check valve means operatively interposed between said compartments and responsive to movement of said piston assembly in only one axial direction for connecting said compartments in said intermediate position of said piston portion.

6. A spring as set forth in claim 5, wherein said check valve means respond to a pressure differential between said compartments generated by external force axially applied to said other part of said piston rod portion and moving said piston assembly.

7. A spring as set forth in claim 5, wherein said piston portion and said cylinder define therebetween an axial flow path communicating with one of said compartments, and said check valve means include a piston ring mounted on said piston portion for limited axial movement between a first position and a second position in sealing engagement with said cylinder, said piston ring being formed with an axial opening therethrough, said opening communicating with the other one of said compartments in all axial positions of said piston ring, said piston ring in said first position engaging said piston portion and thereby sealing said flow path, said opening communicating with said flow path in said second position of said piston ring.

8. A pneumatic spring comprising:
  a. a cylinder having an axis and bounding a cavity therein;
  b. a piston assembly including
    1. a piston portion axially movable in said cavity between two terminal positions and axially separating two compartments of said cavity, and
    2. an axially elongated piston rod portion having one axially terminal part fastened to said piston portion in said cavity and another axially terminal part outside said cavity, said piston rod portion movably passing through said cylinder, said terminal positions of said piston portion being adjacent and remote from said other axially terminal part of said piston rod portion respectively;
  c. a fluid sealed in said compartments, the pressure of said fluid being higher than atmospheric pressure in all axial positions of said piston portion, whereby said fluid permanently biases said piston rod portion outward of said cavity;
  d. conduit means bounding a channel connecting said compartments for flow of said fluid between said compartments; and
  e. cooperating valve means on said cylinder and on said piston assembly responsive to movement of said piston portion into a position spacedly intermediate said terminal positions for closing said channel and for thereby sealing said compartments from each other, and responsive to movement of said piston portion from said intermediate position toward said remote terminal position thereof for opening said channel.

9. A spring as set forth in claim 8, wherein said valve means further respond to movement of said piston portion from said intermediate position toward said adjacent terminal position thereof for opening said channel.

10. A spring as set forth in claim 9, wherein said fluid includes a body of gas under said higher pressure.

* * * * *

UNITED STATES PATENT AND TRADEMARK OFFICE
CERTIFICATE OF CORRECTION

PATENT NO. : 4,066,279
DATED : January 3, 1978
INVENTOR(S) : Panoyotis Kaptanis

It is certified that error appears in the above–identified patent and that said Letters Patent are hereby corrected as shown below:

Claim 1, line 13, after "fluid" insert -- sealed --

Signed and Sealed this

Eighteenth Day of April 1978

[SEAL]

Attest:

RUTH C. MASON
Attesting Officer

LUTRELLE F. PARKER
Acting Commissioner of Patents and Trademarks